United States Patent [19]
Kenefic

[11] Patent Number: 5,854,601
[45] Date of Patent: Dec. 29, 1998

[54] METHODS FOR ESTIMATING THE NUMBER OF EMITTERS AND THEIR PARAMETERS

[75] Inventor: Richard J. Kenefic, Fort Wayne, Ind.

[73] Assignee: Hughes Electronics, Los Angeles, Calif.

[21] Appl. No.: 641,117

[22] Filed: Apr. 29, 1996

[51] Int. Cl.$^6$ .................................................. G01S 13/06
[52] U.S. Cl. ............................ 342/13; 342/156; 342/424
[58] Field of Search .............................. 342/13, 90, 115, 342/135, 140, 113, 156, 417, 418, 442, 424

[56] References Cited

U.S. PATENT DOCUMENTS

| | | | |
|---|---|---|---|
| 4,559,602 | 12/1985 | Bates, Jr. ................................ | 364/487 |
| 4,592,034 | 5/1986 | Sachse et al. ........................... | 367/127 |
| 4,728,958 | 3/1988 | Choate .................................... | 342/424 |
| 5,276,772 | 1/1994 | Wang et al. ............................. | 395/27 |
| 5,406,286 | 4/1995 | Tran et al. ............................... | 342/13 |
| 5,526,001 | 6/1996 | Rose et al. ............................... | 342/442 |
| 5,565,764 | 10/1996 | Priebe et al. .......................... | 324/76.21 |
| 5,613,039 | 3/1997 | Wang et al. ............................. | 395/22 |

OTHER PUBLICATIONS

"Direction of Arrival Estimation Via Extended Phase Interferometry," Ying–Wah Wu et al., *IEEE Transactions on Aerospace and Electronic Systems*, vol. 31, No. 1, Jan. 1995.
"Estimation of Amplitude and Phase Parameters of Multicomponent Signals," *IEEE Transactions on Signal Processing*, vol. 43, No. 4, Apr. 1995.
"Computationally Efficient Angle Estimation for Signals with Known Waveforms," *IEEE Transactions on Signal Processing*, vol. 43, No. 9, Sep. 1995.
*Introduction to Statistical Pattern Recognition*, by K. Fukunaga, Academic Press, New York, 1972, pp. 173.
*Statistical Signal Processing*, by L. Scharf, Addison–Wesley, New York, 1991, p. 55.

*Primary Examiner*—John B. Sotomayor
*Attorney, Agent, or Firm*—Michael W. Sales; Wanda K. Denson-Low

[57] ABSTRACT

A method for estimating the number of emitters of intermittent or periodic pulsed energy waveforms received at a sensor location and the parameters of the intermittent or periodic energy waveforms, including: accumulating over a selected period of time output of the sensor, the output consisting of a set of vectors, each of the vectors consisting of at least one element of parameters of direction, frequency, and amplitude, and which element(s) specify(ies) a point in a space defined by the element(s) for each of the waveforms received when at least the parameter of direction is included; dividing the space into a plurality of bins, considering each vector in turn, and apportioning weight of each vector to be accumulated within at least some of the plurality of bins; determining at the end of the selected period of time which of the bins exceed a threshold strength and are, therefore, the emitters; and calculating the at least one element of parameters for each emitter as appropriate for the vector elements selected for the space.

4 Claims, 7 Drawing Sheets

(7 of 7 Drawing Sheet(s) Filed in Color)

Collapsed amplitude planes for all reported emitters with all hits shown(o), and the emitters reported (x) for the 3D method. Dense data set.

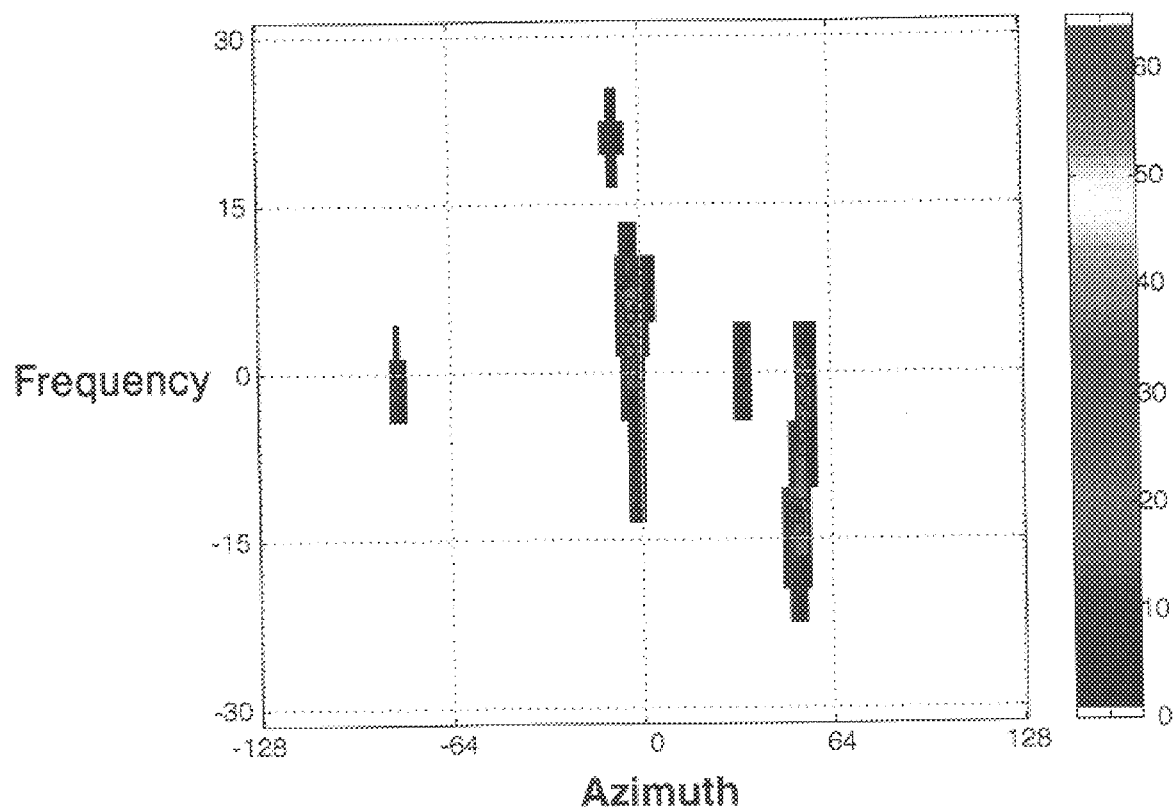
FIG. 1 Amplitude plane 1 with those hits whose amplitudes lie in the plane (o), and the emitters found in this plane (x). Sparse data set.

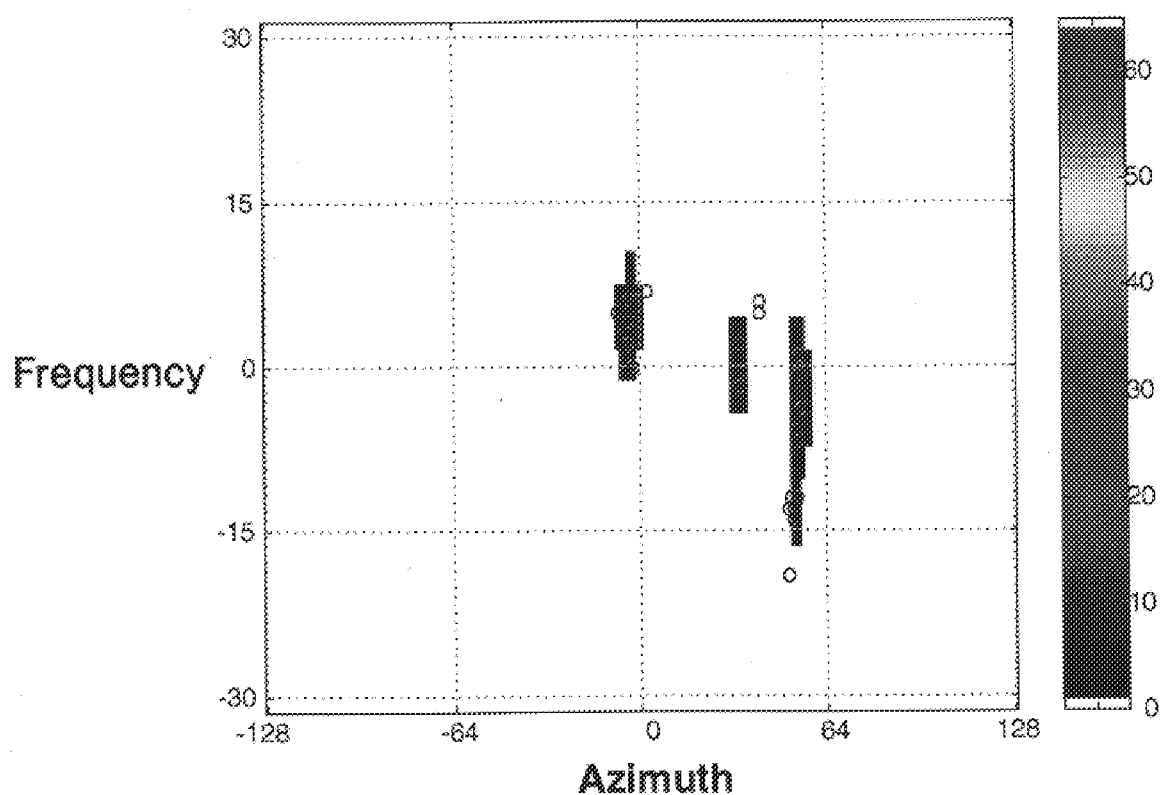
FIG. 2 Amplitude plane 2 with those hits whose amplitudes lie in the plane (o), and the emitters found in this plane (x). Sparse data set.

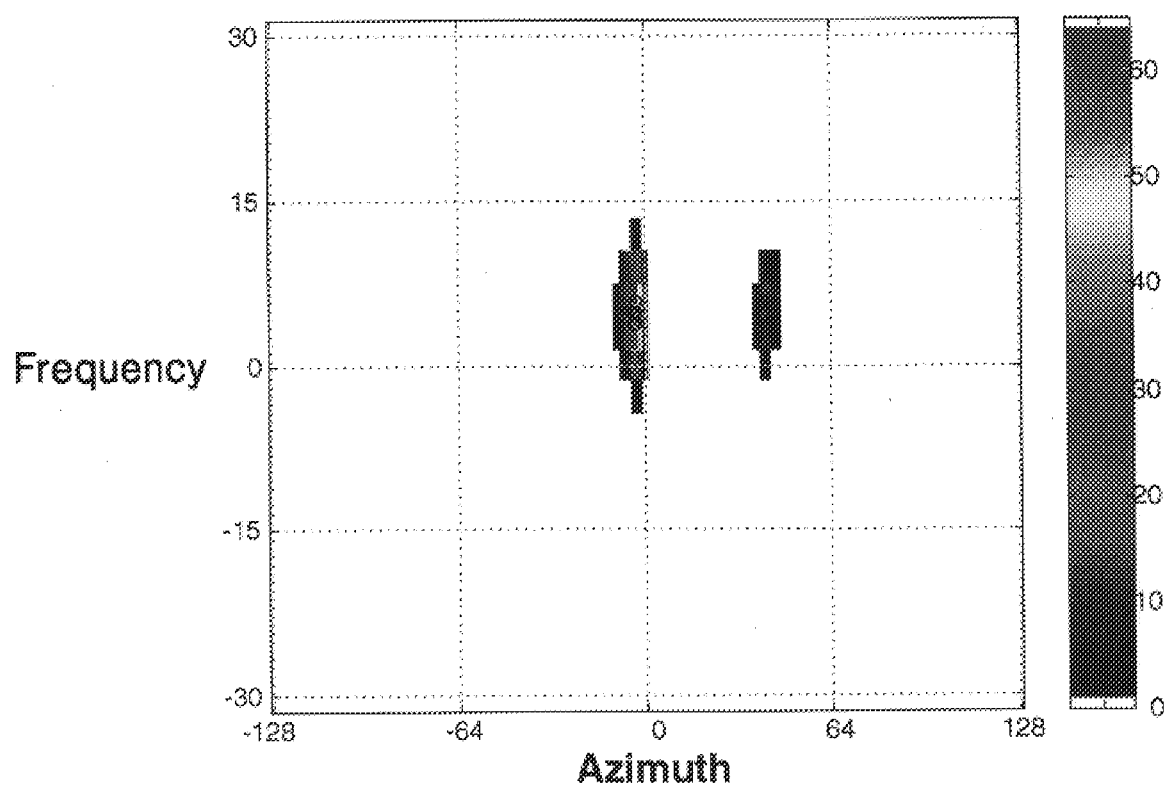
FIG. 3 Amplitude plane 3 with those hits whose amplitudes lie in the plane (o), and the emitters found in this plane (x). Sparse data set.

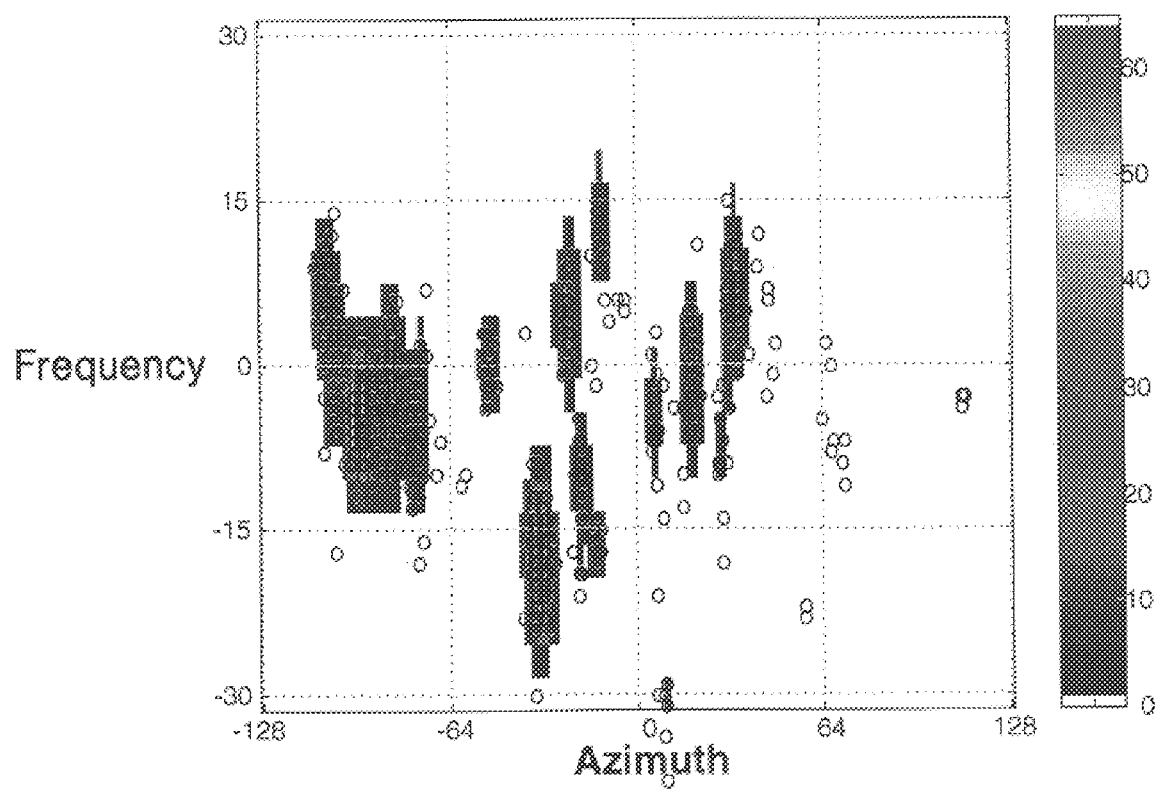
FIG. 4 Amplitude plane 1 with those hits whose amplitudes lie in the plane (o), and the emitters found in this plane (x). Dense data set.

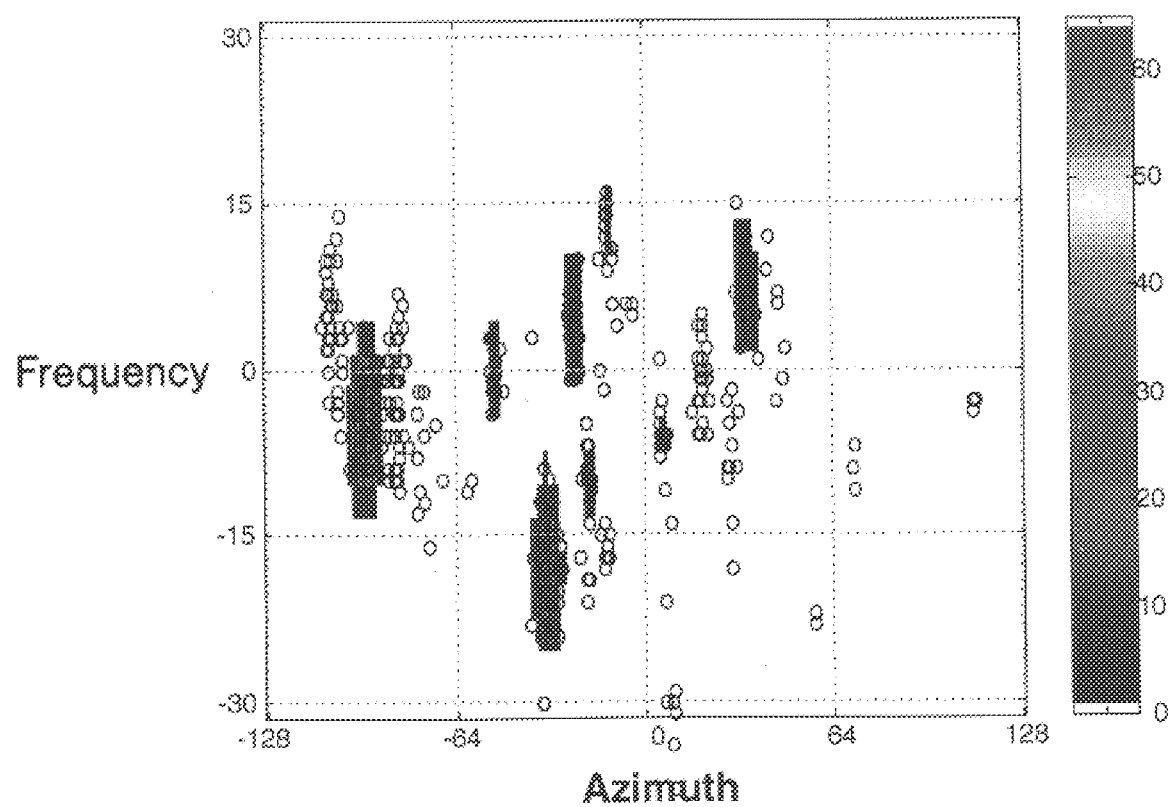
FIG. 5 Amplitude plane 2 with those hits whose amplitudes lie in the plane (o), and the emitters found in this plane (x). Dense data set.

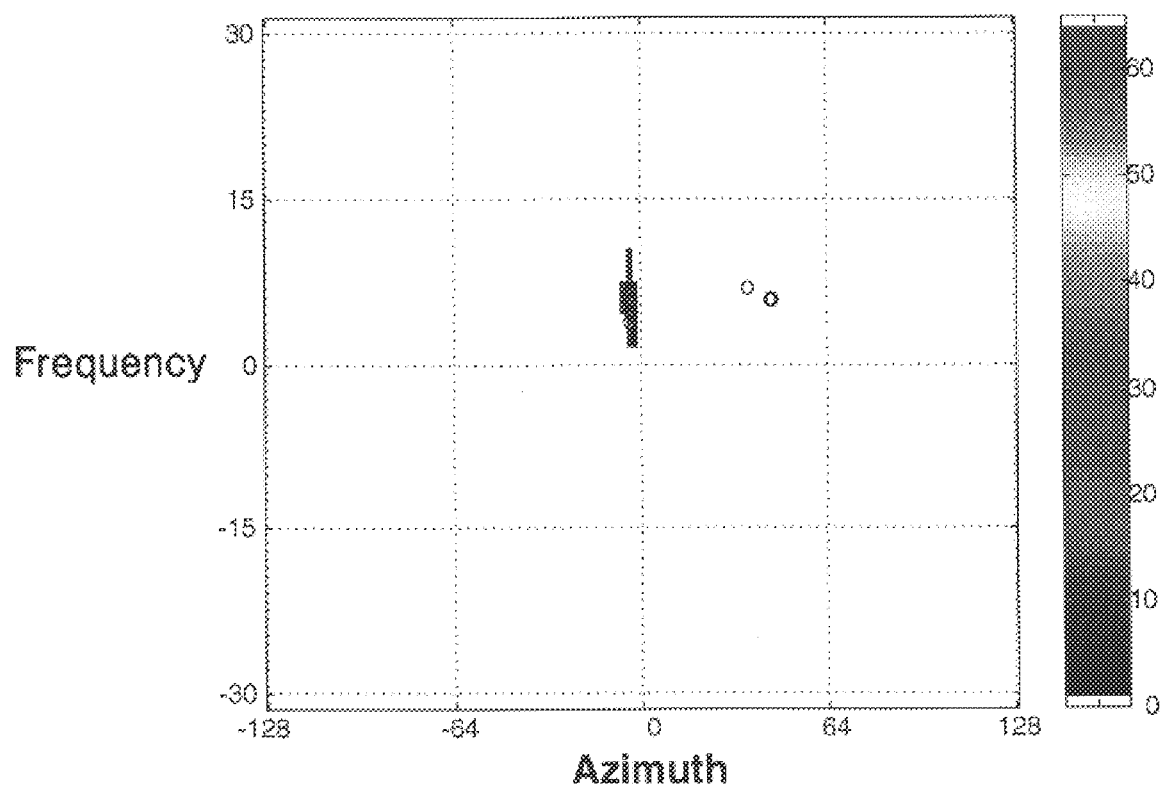
FIG. 6 Amplitude plane 3 with those hits whose amplitudes lie in the plane (o), and the emitters found in this plane (x). Dense data set.

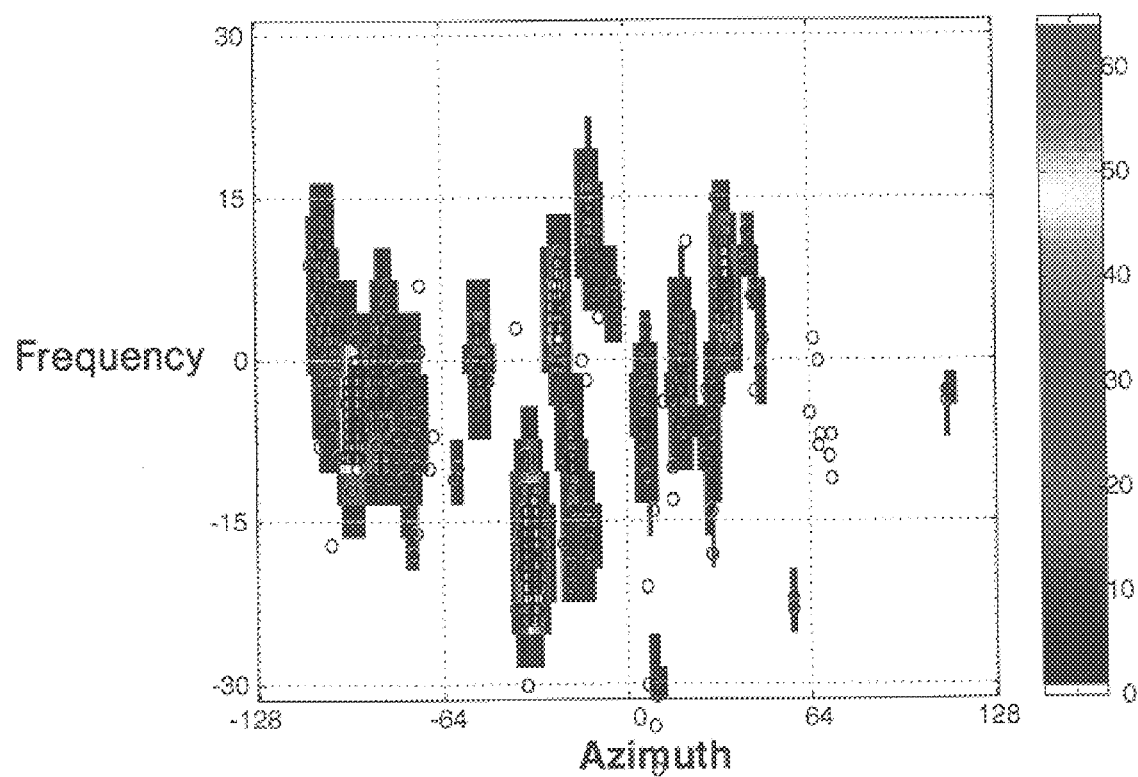
FIG. 7 Collapsed amplitude planes for all reported emitters with all hits shown(o), and the emitters reported (x) for the 3D method. Dense data set.

METHODS FOR ESTIMATING THE NUMBER OF EMITTERS AND THEIR PARAMETERS

BACKGROUND OF THE INVENTION

1. Field of the Invention

The present invention relates to multiple emitters generally and, more particularly, but not by way of limitation, to novel methods for estimating the number and parameters of emitters.

2. Background Art

The estimation of the number of emitters and their parameters is a topic of considerable interest in the current literature and a number of estimation methods have been developed. See, for example: "Direction of Arrival Estimation Via Extended Phase Interferometry," by Ying-Wah Wu et al., *IEEE Transactions on Aerospace and Electronic Systems*, Vol. 31, No. 1, January 1995; "Estimation of Amplitude and Phase Parameters of Multicomponent Signals," IEEE Transactions on Signal Processing," by Benjamin Friedlander et al., *IEEE Transactions on Signal Processing*, Vol. 43, No. 4, April 1995; "Computationally Efficient Angle Estimation for Signals with Known Waveforms," by Jian Li et al., *IEEE Transactions on Signal Processing*, Vol. 43, No. 9, September 1995; and the references cited therein. These references deal with the processing of a signal impinging on a sensor in order to determine the number and parameters of emitters that are contained in the impinging signal, the result of such processing being the sensor output. The signals themselves may be radio frequency, infrared, optical, acoustic, seismic, or any other type of intermittent or periodic or pulsed emission of energy from one or more emitters to be collected by one or more sensors.

Examples of applications that make use of such sensor outputs typically include the tracking of a multiplicity of emitters by one or more sensors, as in the tracking of a multiplicity of submarines by a field of sonobuoys tuned to detect sonar emissions from the submarines. Algorithms for such tracking are in general use as described in "Multi-Target Tracking with Radar Application," by Samuel Blackman, Artech House, Norwood, Mass., copyright 1986, and several other current texts. Such tracking algorithms have a computational load that is dependent on the number of input vectors presented to the tracking algorithm by the sensors over a unit of time. In dense emitter environments, the computational load required of such tracking algorithms precludes the real time operation of these algorithms.

Accordingly, it is a principal object of the present invention to provide methods for operating on the output of a sensor receiving signals from emitters, which output is collected over several units of time, in order to estimate the number and parameters of emitters in the collected sensor output and reduce the number of input vectors per unit of time that are presented to a tracking algorithm.

It is a further object of the invention to provide such methods that are accurate and efficient.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a method for estimating the number of emitters of intermittent or periodic pulsed energy waveforms received at a sensor location and the parameters of said intermittent or periodic energy waveforms, comprising: accumulating over a selected period of time output of said sensor, said output consisting of a set of vectors, each of said vectors consisting of at least one element of parameters of direction, frequency, and amplitude, and which element(s) specify(ies) a point in a space defined by said element(s) for each of said waveforms received when at least said parameter of direction is included; dividing said space into a plurality of bins, considering each said vector in turn, and apportioning weight of said each said vector to be accumulated within at least some of said plurality of bins; determining at the end of said selected period of time which of said bins exceed a threshold strength and are, therefore, said emitters; and calculating said at least one element of parameters for each said emitter as appropriate for said vector elements selected for said space.

BRIEF DESCRIPTION OF THE DRAWING

The file of this patent contains at least one drawing executed in colors.

Understanding of the present invention and the various aspects thereof will be facilitated by reference to the accompanying drawing figures, submitted for purposes of illustration only and not intended to define the scope of the invention, on which:

FIGS. 1–7 illustrate results achieved by the methods of the present invention.

DETAILED DESCRIPTION OF THE PREFERRED EMBODIMENTS

In the problem considered by the method of the present invention, emitters radiate on a single frequency only, the signal shape is known, but the arrival angle, center frequency, amplitude, and time of arrival are all unknown. The signals are of very short duration, and so the simultaneous arrival of signals at the receiver is a rare event. The receiver processes the observed signal assuming that only one emission might be present (using, for example, a matched filer). If an emission is detected, the receiver adds a vector of parameter estimates to a buffer for further processing by the sorting method. At the end of the collection interval, the set of vectors is processed by the sorting method, and the emitter report is passed on for further processing. While in the method of the present invention, the arrival angle is expressed in terms of azimuth, the arrival angle could be expressed in terms of elevation, or the arrival angle could be expressed in terms of both azimuth and elevation.

The development of the method starts with the assumption that the probability density function for the receiver parameter estimates is unimodal and that the estimates are almost independent. Also, it is assumed that the variances of the estimates may be approximated by the variance associated with the minimum detectable signal level. Since the duration of signal collection is short, it is assumed that the amplitude from an emitter will be constant over the collection interval. Under this assumption, amplitude can be used to discriminate between different emitters and different propagation paths from the same emitter. The set of vectors passed from the receiver contains no "noise". There may be vectors in the set that are a result of interference from own ship, multipath from an emitter producing direct path vectors, and "outliers" resulting from interference between near simultaneous arrivals of two emitter signals at the receiver. "Outliers" are rare and tend to drop out after thresholding. any persistent emission, whether from own ship, multipath, or a direct path emitter, will be reported as an emitter for further processing.

DERIVATION

Let $X^N = \{\bar{x}_1, \ldots, \bar{x}_N\}$ represent the set of output vectors from the receiver. These vectors may be partitioned into disjoint subsets where each subset represents the collection of vectors from an emitter. It is assumed that the probability density function of each subset of vectors is unimodal. The number of emitters, emitter parameters, and partitioning of the set of vectors into emitter subsets is unknown. Hence, the probability density function of any one vector in the set of output vectors is a mixture of unimodal densities where the constants in the mixture and the shapes of each unimodal density are unknown. In the 3D method, a function proportional to the Parzen estimate of the density function for any single output vector is constructed. The local maxima of this function are used to obtain the number of emitters and their associated parameters.

THE 3D METHOD

Consider a set of vectors, $\bar{x}_1, \ldots \bar{x}_N$ where $\bar{x}_n = [\alpha_n \, \omega_n \, A_n \, t_n]^T$ and where $\alpha_n$, $\omega_n$, $A_n$, and $t_n$ represent azimuth, frequency, amplitude, and time of arrival for the $n^{th}$ hit. Ignoring arrival time, the remaining entries in each vector specify a point in three dimensions. This three dimensional space is divided up into "bins" whose centers are spaced $1-\sigma$ apart in each dimension, where $\sigma$ is the standard deviation of a parameter represented by a corresponding dimension at a signal-to-noise ratio that is a munimum detectable level (i.e., a signal-to-noise ratio that yields a detection probability of 0.5 at a specified sensor false alarm probability). The closest bin to the $n^{th}$ hit is found, and all bins within $3-\sigma$ of this bin are updated in a fashion similar to computing the Parzen estimate of the multivariate distribution with a Normal kernel. Let $\{\bar{i}_n\}$ represent the set of all indices for bins to be updated for the $n^{th}$ hit. Let $\bar{i} = (i,j,k)$ where i, j, and k are the indices for azimuth, frequency, and amplitude, respectively. The 3D method computes the function $f(\alpha, \omega, A)$ sampled at the bin centers as $$f(i\sigma_\alpha, j\sigma_\omega, k\sigma_A) = \quad (1)$$

$$\sum_{\substack{n=1 \\ \text{for } \bar{i} \in \{\bar{i}_n\}}}^{N} \exp\left(-\frac{1}{2}\left(\left(\frac{(\alpha_n - i\sigma_\alpha)}{\sigma_\alpha}\right)^2 + \left(\frac{(\omega_n - j\sigma_\omega)}{\sigma_\omega}\right)^2 + \left(\frac{(A_n - k\sigma_A)}{\sigma_A}\right)^2\right)\right)$$

for $(i,j,k) \in \cup^N\{\bar{i}_n\}$. $f(\alpha,\omega,A)$ is zero for all other (i,j, k). The Normal kernel in (1) is not normalized by the variance, as as in the Parzen estimate of the multivariate probability density function. Note that a vector that is centered in a bin contributes "one" to the result for the function and a relatively small amount to the surrounding bins. After the set of vectors is processed, the sampled values of f can be interpreted as a weighted average of the number of hits in the vicinity of each bin. Those samples that lie above a threshold are processed further. Since it is assumed that the probability density functions for the measurements from each emitter are all unimodal, the method tests those bins above threshold to determine if they are local maxima. The estimates of the emitter parameters are obtained by a parabolic interpolation about the local maxima. Let $(i_l, j_l, k_l), l=1, \ldots, L$ represent the indices of the bins that are greater than the threshold, $\eta$. Let $\{\bar{m}_l\}$ represent the set of indices within $\kappa\sigma$ cube centered at the $l^{th}$ bin, and excluding the $l^{th}$ bin. Then the set of bins that contains emitters is given by $$\{(i_p, j_p, k_p), p = 1, \ldots, P\} = \left\{ (i_l, j_l, k_l) \middle| f_l \geq \max_{\{\bar{m}_l\}} (f) \right\} \quad (2)$$

where $f_l$ represents f evaluated at the $l^{th}$ bin. Once the emitter bins have been found, the parameters are obtained using a parabolic interpolation. For example, to estimate azimuth, let $f_{p-1} = f((i_p-1)\sigma_\alpha, j_p\sigma_\omega, k_p\sigma_A)$, $f_p = f(i_p\sigma_\alpha, j_p\sigma_\omega, k_p\sigma_A)$, and $f_{p+1} = f((i_p+1)\sigma_\alpha, j_p\sigma_\omega, k_p\sigma_A)$. Then the estimate of the $p^{th}$ emitter azimuth is given by $$\hat{\alpha}_p = i_p \sigma_\alpha + \frac{1}{2} \sigma_\alpha \frac{f_{p+1} - f_{p-1}}{(2f_p - f_{p-1} - f_{p+1})} . \quad (3)$$

Similar results apply for the estimates of frequency and amplitude. Since the function f is proportional to the probability density function for the $p^{th}$ emitter in the neighborhood of the $p^{th}$ bin (ignoring the distortion from the other pdf's), the estimates can be interpreted as maximum a posteriori estimates of the parameters for the $p^{th}$ emitter.

The method occasionally produces two identical emitters, due to the use of equality in equation (2). Without equality in equation (2), the method would fail to report some emitters. The constants used in the description of the method (e.g., $\sigma_\alpha$, $\sigma_\omega$, $\sigma_A$, $\eta$, and $\kappa$) are parameters that can be tuned to optimize performance. Also, the exponential in (1) can be replaced with a suitable positive function to speed up the computation or optimize performance. The algorithm presented here will be referred to as the 3D method. In the 2D method described below, a slight modification to this algorithm is presented to speed up the processing required for very large data sets. This modification results in a slight degradation in performance, but a significant increase in speed.

THE 2D METHOD

In this method, one dimension contains a very small number of bins and each bin in this dimension is treated like a plane in testing for the local maximum. There are three bins (planes) in amplitude for this method, the closest bin for the $n^{th}$ hit is found in each amplitude plane, and all bins within $3-\sigma$ in azimuth and frequency are updated. Let $\{\bar{i}_{n,k}\}$ represent the set of all indices for bins to be updated for the $n^{th}$ hit in the $k^{th}$ plane. The 2D method computes the function $$f_k(i\sigma_\alpha, j\sigma_\omega) = \quad (4)$$

$$\sum_{\substack{n=1 \\ \text{for } \bar{i} \in \{\bar{i}_{n,k}\}}}^{N} \exp\left(-\frac{1}{2}\left(\left(\frac{(\alpha_n - i\sigma_\alpha)}{\sigma_\alpha}\right)^2 + \left(\frac{(\omega_n - j\sigma_\omega)}{\sigma_\omega}\right)^2\right)\right) g_k(A_n)$$

for k=1, 2, 3. Each plane is processed separately, and the emitters for each plane are merged to form the final set of reported emitters. The function $g_k$ is given by $$g_1(A_n) = \begin{cases} 1 & \text{for } A_n \leq \lfloor \frac{A_{max}}{6} \rfloor \\ 1 - \frac{A_n - \lfloor \frac{A_{max}}{6} \rfloor}{\lceil \frac{A_{max}}{3} \rceil} & \text{for } \frac{A_{max}}{2} > A_n > \lfloor \frac{A_{max}}{6} \rfloor \\ 0 & \text{elsewhere} \end{cases} \quad (5)$$

$$g_2(A_n) = \begin{cases} 1 - \frac{\frac{A_{max}}{2} - A_n}{\lceil \frac{A_{max}}{3} \rceil} & \text{for } \frac{A_{max}}{2} \geq A_n > \lfloor \frac{A_{max}}{6} \rfloor \\ 1 - \frac{A_n - \frac{A_{max}}{2}}{\lceil \frac{A_{max}}{3} \rceil} & \text{for } \lceil \frac{5A_{max}}{6} \rceil > A_n > \frac{A_{max}}{2} \\ 0 & \text{elsewhere} \end{cases} \quad (6)$$

$$g_3(A_n) = \begin{cases} 1 & \text{for } A_{max} \geq A_n \geq \lceil \frac{5A_{max}}{6} \rceil \\ 1 - \frac{\lceil \frac{5A_{max}}{6} \rceil - A_n}{\lceil \frac{A_{max}}{3} \rceil} & \text{for } \lceil \frac{5A_{max}}{6} \rceil > A_n > \frac{A_{max}}{2} \\ 0 & \text{elsewhere} \end{cases} \quad (7)$$

Where $A_{max}$ is the maximum of the amplitude, $\lceil x \rceil$ is the smallest integer greater than x, and $\lfloor x \rfloor$ is the greatest integer less than x. Let $(i_l, j_l, k), l=1, \ldots L_k$ represent the indices of the $L_k$ bins that are greater than the threshold, $\eta$, in the $k^{th}$ amplitude plane. Let $\{\overline{m}_{l,k}\}$ represent the set of indices within a $\kappa\sigma$ square centered at the $l^{th}$ bin in the $k^{th}$ amplitude plane, excluding the $l^{th}$ bin. Then the set of bins in the $k^{th}$ plane that contain emitters is $$\{(i_p, j_p, k), p = 1, \ldots, P_k\} = \left\{ (i_l, j_l, k) | f_{l,k} \geq \max_{\{\overline{m}_{l,k}\}} (f) \right\} \quad (8)$$

where $f_{l,k}$ represents f evaluated at the $l^{th}$ bin in the $k^{th}$ amplitude plane. Once the emitter bins have been found, azimuth and frequency are estimated using parabolic interpolation, as in equation (3). To obtain the final set of emitters, redundant emitters in each plane are removed first. Next, emitters in adjacent planes are compared using the Mahalinobis distance $$d^2_{k_1 k_2} = \left( \frac{\hat{\alpha}_{k_1} - \hat{\alpha}_{k_2}}{\sqrt{2}\,\sigma_\alpha} \right)^2 + \left( \frac{\hat{\omega}_{k_1} - \hat{\omega}_{k_2}}{\sqrt{2}\,\sigma_\omega} \right)^2 \quad (9)$$

where $k_1$ and $k_2$ are adjacent amplitude planes and every estimate in the $k_1$ plane is compared with every estimate in the $k_2$ plane. When estimates in the adjacent planes come from the same emitter, $d^2_{k_1 k_2}$ is central chi-squared with two degrees of freedom (assuming Gaussian errors on the estimates). If $d^2_{k_1 k_2} < 9.21$ (a miss probability of 0.01), then the emitter with the smaller f is dropped. Note that emitters in planes 1 and 3 that satisfy this condition are unaffected. This permits the detection of a distant emitter at nearly the same azimuth and frequency as a nearby emitter.

RESULTS

Both methods were evaluated using over 100 data sets representing typical target densities. The data varies from sparse, containing about 50 hits, to dense, containing over 1000 hits. Azimuth is an integer in the range −128 to +128, frequency is an integer in the range −30 to +30, and amplitude is an integer in the range 0 to $A_{max}$=256. The parameters used for the 2D method were $\sigma_\alpha$=2, $\sigma_\omega$=3, $\kappa$=2.0, and $\eta$=2.0. An azimuth of zero corresponds to the boresight of the receive antenna and a frequency of zero corresponds to the center of the band to which the receiver is tuned.

There were only minor variations between the emitter reports for the 2D and 3D methods in sparse environments. A typical example of the 2D method in a sparse environment is presented on FIGS. 1–3, which shows the amplitude planes, those hits that have amplitudes that lie in the plane, and emitters reported in each plane.

The emitter report for this example is present in Table I.

An example of the 2D method in a dense environment is shown on FIGS. 4–6. The threshold setting for this example was $\eta$=4.0. The emitter report for this example is presented in Table II.

The dense data set was also evaluated using the 3D method. The results are presented on FIG. 7 and in Table III. To obtain FIG. 7, all of the azimuth and frequency bins were added in the plane of the peak amplitude response for each emitter.

Comparison of Tables II and III reveals that the emitter at an azimuth and frequency of −33.7491 and −17.8938 in the 2D method has been resolved into two emitters, one at (−33.8889, −18.3197) with an amplitude of 56.2207 and another at (−33.4136, −17.4107) with an amplitude of 93.5981. The remaining emitters are close to the 2D emitter report.

The data show that the 2D method emitter reports are very close to the reports of the 3D method for typical target densities. There is, in fact, only one data set of the 100 in the test where the 2D method appears to miss an emitter found by the 3D method. It is expected that the 2D method can process the receiver buffer in real time, even in dense emitter environments.

TABLE I

| Emitter number | Azimuth | Frequency | Amplitude | $f_k$ |
|---|---|---|---|---|
| 1 | −3.1761 | 4.26320 | 46.0000 | 3.5299 |
| 2 | 52.6058 | −12.6173 | 46.0000 | 3.6277 |
| 3 | 54.5047 | −2.6170 | 46.0000 | 2.7344 |
| 4 | −3.5667 | 4.78590 | 210.0000 | 9.2083 |
| 5 | 41.9458 | 5.69010 | 210.0000 | 2.0598 |

Emitter report for sparse data set using the 2D method.

TABLE II

| Emitter number | Azimuth | Frequency | Amplitude | f |
|---|---|---|---|---|
| 1 | −105.7159 | 5.7930 | 46.000 | 16.0220 |
| 2 | −94.6764 | −5.5973 | 46.000 | 103.8076 |
| 3 | −85.4510 | −2.5590 | 46.000 | 27.2940 |
| 4 | −75.5783 | −5.8606 | 46.000 | 8.3640 |
| 5 | −50.7428 | 0.1150 | 46.000 | 9.7306 |

TABLE II-continued

| Emitter number | Azimuth | Frequency | Amplitude | f |
|---|---|---|---|---|
| 6 | −33.7491 | −17.8938 | 46.000 | 89.7573 |
| 7 | −23.9760 | 4.8037 | 46.000 | 36.8469 |
| 8 | −19.1930 | −9.6510 | 46.000 | 9.5494 |
| 9 | −12.2896 | 13.6185 | 46.000 | 9.1899 |
| 10 | 5.9838 | −5.3292 | 46.000 | 7.1478 |
| 11 | 19.5127 | −1.6225 | 46.000 | 18.7476 |
| 12 | 34.3138 | 6.4739 | 46.000 | 33.4121 |
| 13 | −3.6910 | 5.3537 | 210.000 | 7.1367 |

Emitter report for the dense data set using the 2D method.

TABLE III

| Emitter number | Azimuth | Frequency | Amplitude | f |
|---|---|---|---|---|
| 1 | −85.3246 | −2.4448 | 42.4337 | 20.1601 |
| 2 | −75.2529 | −4.4510 | 43.2506 | 5.1047 |
| 3 | −106.0466 | 6.0202 | 46.6709 | 12.2166 |
| 4 | −33.8889 | −18.3197 | 56.2207 | 50.2402 |
| 5 | 19.6792 | −1.4782 | 51.4564 | 10.7291 |
| 6 | −24.0120 | 4.8201 | 66.6892 | 26.6934 |
| 7 | −19.1309 | −9.3926 | 72.4223 | 8.9518 |
| 8 | −12.3435 | 13.6423 | 70.3558 | 7.3977 |
| 9 | 34.5008 | 6.6346 | 72.3670 | 25.4716 |
| 10 | −50.8657 | −0.3205 | 77.6984 | 9.5487 |
| 11 | 5.8936 | −5.9484 | 78.8479 | 7.1626 |
| 12 | −94.5275 | −5.5363 | 82.2347 | 143.3741 |
| 13 | −33.4136 | −17.4107 | 93.5981 | 26.7999 |
| 14 | −3.7242 | 5.3764 | 221.2836 | 6.3753 |

Emitter report for the dense data set using the 3D method.

It will thus be seen that the objects set forth above, among those elucidated in, or made apparent from, the preceding description, are efficiently attained and, since certain changes may be made in the above methods without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A method for estimating the number of emitters of intermittent or periodic pulsed energy waveforms received at a sensor location and the parameters of said intermittent or periodic energy waveforms, comprising:
   (a) accumulating over a selected period of time output of said sensor, said output consisting of a set of vectors, each of said vectors consisting of at least one element of parameters of direction, frequency, and amplitude, and which element(s) specify(ies) a point in a space defined by said element(s) for each of said waveforms received when at least said parameter of direction is included;
   (b) dividing said space into a plurality of bins, considering each said vector in turn, and apportioning weight of said each said vector to be accumulated within at least some of said plurality of bins;
   (c) determining at the end of said selected period of time which of said bins exceed a threshold strength and are, therefore, said emitters; and
   (d) calculating said at least one element of parameters for each said emitter as appropriate for said vector elements selected for said space.

2. A method, as defined in claim 1, wherein:
   (a) said point is a point in three dimensions for each of said waveforms received when said parameter of direction relates to either azimuth or elevation of arrival and said elements include both frequency and amplitude;
   (b) said point is a point in four dimensions for each of said waveforms received when said parameter of direction relates to both azimuth and elevation of arrival and said elements include both frequency and amplitude;
   (c) said point is a point in three dimensions for each of said waveforms received when said parameter of direction relates to both azimuth and elevation of arrival and said elements include either frequency or amplitude;
   (d) said point is a point in two dimensions for each of said waveforms received when said parameter of direction relates to either azimuth and elevation of arrival and said elements include either frequency or amplitude; and
   (e) said point is a point in appropriate dimensions for each of said waveforms received when said parameter of direction or any other vector element(s) is(are) included.

3. A method, as defined in claim 1, wherein:
   (a) said step of dividing a space comprises dividing said space into bins having centers spaced apart a first selected distance; and
   (b) said step of determining which of said bins exceed a threshold strength comprises:
      (i) selecting each of said bins in turn and measuring the strength of said each of said bins;
      (ii) testing said strength against a threshold, and for any bin whose said strength exceeds said threshold, measuring greatest of all strengths of neighboring bins within a second selected distance in every direction from said each of said bins, excluding said strength of said each of said bins; and
      (iii) determining that said each of said bins is an emitter if said strength measured in step (i) is at least equal to said greatest of all strengths of said neighboring bins measured in step (ii).

4. A method, as defined in claim 3, wherein:
   (a) said first selected distance is σ, where σ is the standard deviation of said parameter represented by a corresponding dimension in said space at a signal-to-noise ratio that is a minimum detectable level (i.e., a signal-to-noise ratio that yields a detection probability of 0.5 at a specified sensor false alarm probability); and
   (b) said second selected distance is σ.

* * * * *